United States Patent
Peppe

(10) Patent No.: US 11,606,372 B2
(45) Date of Patent: Mar. 14, 2023

(54) MITIGATING AGAINST MALICIOUS LOGIN ATTEMPTS

(71) Applicant: T-Mobile USA, Inc., Bellevue, WA (US)

(72) Inventor: Brett C. Peppe, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 170 days.

(21) Appl. No.: 15/847,388

(22) Filed: Dec. 19, 2017

(65) Prior Publication Data

US 2019/0190934 A1    Jun. 20, 2019

(51) Int. Cl.
*G06F 21/00* (2013.01)
*H04L 9/40* (2022.01)
*G06F 21/55* (2013.01)

(52) U.S. Cl.
CPC ........ *H04L 63/1425* (2013.01); *G06F 21/552* (2013.01); *H04L 63/08* (2013.01); *H04L 63/1441* (2013.01)

(58) Field of Classification Search
CPC . H04L 63/1425; H04L 63/1441; H04L 63/08; G06F 21/552
See application file for complete search history.

(56) References Cited

U.S. PATENT DOCUMENTS

| | | | |
|---|---|---|---|
| 6,351,773 B1 | 2/2002 | Fijolek et al. | |
| 8,312,540 B1 * | 11/2012 | Kahn | G06F 21/552 713/183 |
| 9,088,560 B1 | 7/2015 | Newstadt et al. | |
| 9,148,424 B1 * | 9/2015 | Yang | H04L 63/1416 |
| 10,091,221 B1 | 10/2018 | Yang | |
| 10,356,120 B1 * | 7/2019 | Raviv | H04L 67/22 |
| 2003/0149900 A1 | 8/2003 | Glassman et al. | |
| 2003/0154396 A1 * | 8/2003 | Godwin | G06F 21/552 726/23 |
| 2004/0260952 A1 * | 12/2004 | Newman | H04L 63/104 726/6 |
| 2005/0144297 A1 | 6/2005 | Dahlstrom et al. | |
| 2006/0282660 A1 | 12/2006 | Varghese et al. | |

(Continued)

FOREIGN PATENT DOCUMENTS

WO    2015023316 A1    2/2015

OTHER PUBLICATIONS

U.S. Appl. No. 15/819,711, Non-Final Office Action dated Aug. 6, 2019, 13 pages.

(Continued)

*Primary Examiner* — Trong H Nguyen
*Assistant Examiner* — Michael M Lee
(74) *Attorney, Agent, or Firm* — Han Santos, PLLC

(57) ABSTRACT

Techniques are disclosed for mitigating against malicious login attempts. In some examples, a computer system receives a plurality of login attempts to the system, the plurality of login attempts being originated from an Internet Protocol (IP) subnet. The computer system determines a ratio of successful login attempts to unsuccessful login attempts of the plurality of login attempts. Then, in response to determining that the ratio of a number of successful login attempts to total login attempts is below a predetermined threshold, the computer system denies a future login attempt to the system that is associated with the IP subnet for a first time period.

14 Claims, 7 Drawing Sheets

(56) References Cited

U.S. PATENT DOCUMENTS

| | | | |
|---|---|---|---|
| 2007/0011319 A1* | 1/2007 | McClure | G02B 6/105 709/224 |
| 2009/0055912 A1 | 2/2009 | Choi et al. | |
| 2009/0298470 A1 | 12/2009 | Huber et al. | |
| 2010/0023620 A1 | 1/2010 | Kamikura et al. | |
| 2010/0211996 A1 | 8/2010 | McGeehan et al. | |
| 2012/0237908 A1 | 9/2012 | Fitzgerald et al. | |
| 2013/0232574 A1 | 9/2013 | Carothers | |
| 2014/0181968 A1* | 6/2014 | Ge | H04L 63/1416 726/23 |
| 2015/0113172 A1 | 4/2015 | Johnson et al. | |
| 2015/0213251 A1* | 7/2015 | Turgeman | G06F 21/36 726/7 |
| 2015/0288715 A1 | 10/2015 | Hotchkiss | |
| 2016/0105801 A1 | 4/2016 | Wittenberg et al. | |
| 2016/0180068 A1* | 6/2016 | Das | G06F 21/316 726/7 |
| 2016/0234232 A1* | 8/2016 | Poder | H04L 63/1416 |
| 2016/0248788 A1* | 8/2016 | Saito | H04L 63/1416 |
| 2016/0285888 A1 | 9/2016 | Arunkumar et al. | |
| 2016/0344752 A1 | 11/2016 | Sterne et al. | |
| 2016/0364465 A1* | 12/2016 | Sang | H04L 63/1408 |
| 2017/0078314 A1* | 3/2017 | Mohanty | H04L 63/145 |
| 2017/0181074 A1 | 6/2017 | Caldwell et al. | |
| 2017/0214712 A1* | 7/2017 | Maxwell | G06F 21/46 |
| 2017/0308688 A1 | 10/2017 | Orihara et al. | |
| 2018/0124082 A1* | 5/2018 | Siadati | G06N 5/047 |
| 2018/0349643 A1* | 12/2018 | Kunjachan | G06Q 20/385 |
| 2019/0036930 A1 | 1/2019 | Bartik et al. | |

OTHER PUBLICATIONS

U.S. Appl. No. 15/819,711, Final Office Action dated Jan. 22, 2020, 22 pages.

U.S. Appl. No. 15/819,711, Non Final Office Action dated Sep. 16, 2020, 27 pages.

U.S. Appl. No. 15/819,711, Advisory Action dated Jun. 1, 2020, 4 pages.

U.S. Appl. No. 15/819,711, Notice of Allowance dated Apr. 30, 2021, 31 pages.

* cited by examiner

MITIGATING AGAINST MALICIOUS LOGIN ATTEMPTS

BACKGROUND

There are computer systems connected to the Internet or other communications networks that allow users to remotely login, such as by providing a credential set comprising a username and a password. Malicious users may attempt to gain access to another user's account.

BRIEF DESCRIPTION OF THE DRAWINGS

The Detailed Description is set forth with reference to the accompanying Figures.

DETAILED DESCRIPTION

Overview

Figure 1:
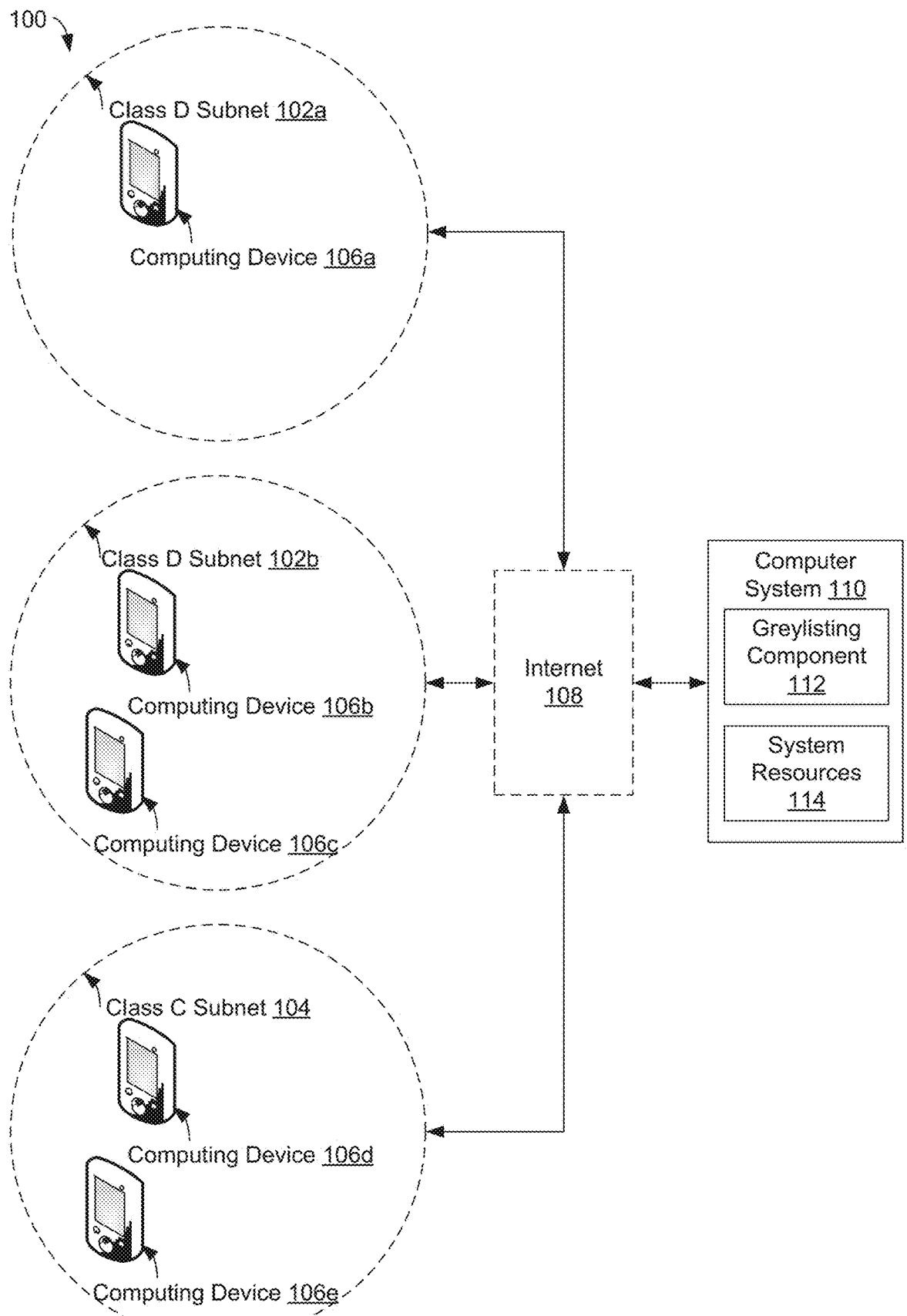
FIG. 1 illustrates an example system architecture for mitigating against malicious login attempts.

Companies and entities may provide web access for computing services to customers and users. These users sometimes re-use their login credentials (e.g., a username and password pair) across multiple web properties. Since users sometimes re-use their credentials, web properties that utilize single-factor authentication may be susceptible to threat actors obtaining valid credential sets for one website, and then assessing of those credential sets have been reused on another website. Once a credential set has been validated for another website, a malicious actor may use those credentials to access that other website for many improper purposes.

It is estimated that there are billions of illicitly obtained credential sets available on the Internet. Users often reuse credential sets between websites, particularly email addresses. Credential reuse can be particularly troublesome for corporate entities with a large web presence.

Some entities implement blacklists for login attempts based on an Internet Protocol (IP) address from which the login attempt is originated (where a login attempt is always denied); whitelists for login attempts based on an IP address from which the login attempt is originated (where a login attempt is always accepted for a valid credential set); and greylists for login attempts based on an IP address from which the login attempt is originated (where a login attempt is conditionally accepted for a valid credential set). It may be the associated entity manually curates these blacklists, whitelists, and greylists—perhaps aided by partial automation.

In addition to these above approaches, adaptive authentication schemes may be implemented that are based on user behavior other than that derived from a source IP address. But these adaptive authentication systems may be expensive to acquire, operate, and maintain, because they are implemented on front-end servers or web servers that are optimized for input/output (I/O) processes, rather than inline computation of the sort associated with adaptive authentication.

Beyond these above adaptive authentication techniques, there may be more lightweight adaptive authentication techniques to build and utilize greylists. Enterprise web portals may be implemented on cloud computing platforms in order to reduce cost, achieve a service-level agreement (SLA) or performance target, and offer federated computing behind a firewall or web application firewall (WAF) appliance. In such an architecture, a front-end server may accept an IP connection, authenticate account credentials, and create a session token. An IP connection on a front-end server may be a low-cost operation in terms of access bandwidth, latency, and server SLA, because a request may be serviced locally on the host.

Authentication on a front-end server may be a high-cost operation in terms of latency and server SLA, because multiple hosts may be federated in the authentication process. This model may work where customer IP connection volumes are low and utilization is far below capacity, or where customer IP connection volumes are high and many authentication requests are from valid customers.

On the other hand, where a significant portion of IP connection volumes arise from malicious threat actors attempting to validate ill-gotten credentials obtained from hack and harvest operations, then performance of a front-end server may decay. One approach to alleviate diminished front-end server performance may be to increase a number of available front-end servers. So, by distributing a workload of connection, authentication, and authorization among multiple servers, cost and performance targets may be met if the servers have the capacity. If a significant fraction of malicious connection attempts can be stopped at the firewall or WAF level, then server performance may be maintained.

However, in such scenarios, a greylist may be maintained on individual front-end servers, rather than for a system as a whole. Hack and harvest attacks may present operational security and operational issues, including: possibly allowing an attacker to verify the existence of an account name; degraded performance of front-end servers; false positives that incorrectly identify valid users as malicious, which may frustrate the valid users and raise care costs. Therefore, implementing end-to-end, adaptive authentication at the end user level may provide a solution, but may be costly in terms of capital expenditures and operational expenditures.

A greylisting approach may be used where login attempts subject to greylisting receive a different treatment than standard authentication. For example, greylisted login attempts may be denied for a period of time, such as 24 hours. An example of such greylisting may be that, if 10 credentials are presented from one IP address in a 20-minute span, then that IP address (and/or those 10 credentials) are greylisted for 24 hours.

This greylisting approach may mitigate login attempts from malicious actors that originate from a single IP address and that make multiple login attempts within a short period of time. However, such greylisting may cause high latency (where communications are transmitted between and processed by multiple parts of a computer system), may be easily subverted, may fail to cover all known malicious use cases, and may have complex operational support issues.

In attempting to login to a computer system with an ill-gotten credential set, a malicious user may have multiple goals, including verification and validation. Verification may include determining whether a user name of the credential set is registered to the computer system. A greylisting process may deny a large-scale mining of verification information by a malicious user. However, where this greylisting is applied to a corporate gateway, it may prevent many legitimate users from logging on. Validation may include determining if the credential set has a valid password. Once a malicious user has a valid credential set, the malicious user could login and access person information for the associated user via the computer system.

Malicious users have developed multiple techniques to bypass or game credential set authentication processes, including spray attacks, spread attacks, and low and slow attacks. Spray attacks may be mitigated by the type of greylist processes described above. In a spray attack, a malicious user submits credential sets for a large number of accounts on a single IP session (which may be an IPv4 session) and records which login attempts are successful. In general, a spray attack may attempt to login once per account. It may be that tens of thousands of attempts are made to login to a computer system from spray attacks in under an hour. The above greylisting approaches limit a malicious user from determining which accounts are valid beyond the maximum attempts value (which is 10 in 20 minutes, using the above example).

In general, spray attacks may be characterized by a large volume of greedy attempts to login that seldom reduce in volume after being greylisted. It is estimated that the above greylisting process may still enable a malicious user to verify about 2% of login attempts when an email address is used as an account credential. So, in a scenario where millions of email addresses are used for login attempts in a month, then tens of thousands of successful credential scraping attempts may occur in a month, where single factor authentication is utilized.

Another issue is a gateway false positive. Some greylisting processes trigger false positives for corporate gateways, depending on their configurations. Some large corporations offer internal WiFi networks to their employees. If an employee mobile device connects to an external computer system via the corporate WiFi network, the outgoing request to connect may be routed via network address translation (NAT) through a small number of heavily-defended external IP addresses. If the number of externally-facing IP addresses is small relative to the number of users attempting to connect to a particular computer system, then many login attempts may be tagged as false positives and greylisted.

In one example, some telecommunications networks assign a Mobile Station International Subscriber Directory Number (MSISDN) to an account, but also allow a subscriber to use an account name (like an email address). In such a case, where a large percentage of logins from an IP address utilize a MSIDSN (such as >90% of logins), it may be determined that they are originating from a gateway, and whitelisted rather than being subject to a greylisting process. In another example, some internet service providers (ISPs) default to a unique account number for a user, but also allow a user to use a preferred email address as an account name. Similar to the above, where a large percentage of logins from an IP address utilize an account number for a user, it may be determined that they are originating from a gateway, and whitelisted rather than being subject to a greylisting process. An enhanced greylisting process may detect and mitigate a gateway false positive issue.

Another issue is a spread attack. A spread attack may occur when a malicious user distributes login attempts across a cluster of related hosts. This attack strategy is an attempt to operate below a level that would be recognized by common firewall strategies, and then mitigated accordingly. It may be that some of these spread attacks are closely clustered, such as by having nearly sequential IPv4 addresses within a Class C or Class D subnet, which indicates (a) compromised server blocks, (b) rented staging hosts, or (c) spoofing. An enhanced greylisting process may detect and mitigate a spread attack issue.

Another issue is a low and slow attack. A low and slow attack may occur in a variety of permutations. In general, a low and slow attack involves a small number of login attempts within a given session, such as within 10-30 minutes. This slow and low attack may evade some greylisting detection, because a rate of login attempts is beneath that which triggers a greylisting process. In some cases, slow and low attacks have been observed as stopping at exactly or nearly-exactly a computer system's maximum connection limit (e.g., 10 connections in 20 minutes), which may indicate that the malicious user engaging in the slow and low attack may detect where a greylisting denial of logging in differs from a fails login attempt (such as due to inputting an incorrect password). An enhanced greylisting process may detect and mitigate a slow and low attack issue.

A solution to these attack issues is provided by an improved greylisting process. An improved greylisting process may be utilized in conjunctions with blacklists (for which no logins are accepted), and whitelists (for which valid logins are accepted, regardless of whether login activity would otherwise trigger a greylisting process for the login attempt).

Adaptive authentication techniques may focus on user behavioral characteristics of an account. Many connections or logins may be analyzed in order to model positive behavior of an individual account. Techniques based on deep behavioral models sometimes require long periods of time to develop stable models. Malicious users have many techniques at their disposal; it may be as simple as harvesting password dumps on the Dark Web. These credential dumps may contain thousands to hundreds of millions of credential sets. A malicious user may replay these credential sets against a computer system and sometimes succeed in recovering a small percentage of accounts that are re-using credentials across different sites.

These actions by a malicious user appear to occur in two general stages, which are referred to here as Stage 1 and Stage 2. In Stage 1, the malicious user verifies the account and attempts to login. In Stage 2, the malicious user validates the success in Stage 1. Attacks in Stage 1 may generally be characterized by many attempts, with a low success rate. Attacks in Stage 2 may generally be characterized be a segmentation that is similar, or even identical, to that seen in Stage 1, but with higher success rates at a later period. A greylisting protocol may block malicious attempts at both Stage 1 and Stage 2. This greylisting protocol may be implemented at the connection level, prior to authentication.

Successful logins generally share some characteristics. Successful logins generally have a median IP count of no more than two per session, usually get the credentials correct on the first login attempt; rarely involve MSISDN logins from suspicious IP addresses, and rarely have significant changes in an IP address in reasonable time windows.

In contrast, malicious logins generally share some other characteristics. Malicious logins generally originate from IPv4 addresses, originate from server blocks located in the United States, and/or geolocation has only some use.

Taking the general characteristics of successful logins and malicious logins together, one may observe that successful logins generally have long and stable historical baselines, there is data for each account that logs in, there are large numbers of observations in chosen segment classes, and/or an ability to build N-pass model validation models.

An IP classifier can segment login attempts into multiple categories, such as: (a) a single host in an IPv4 Class D subnet; (b) multiple hosts in an IPv4 class D subnet; and/or (c) multiple hosts in an IPv4 Class C subnet. For each of these categories, a ratio of the number of successful logins to a total number of logins may be determined and maintained using, for example, a Structured Query Language (SQL) database query on a SQL database in which such information is stored. A similar approach can be used to segment login attempts via IPv6 addresses.

Segmentation can be done using alternative classifiers. Examples of such alternative classifiers include: historical bad actors (which may be blocked); geolocation (which may be blocked upon tagging); known mobile carrier IPv6 addresses (which may be greylisted rarely); and known ISP home IPv6 email addresses (which may be greylisted rarely). In general, large American ISPs may be thought to have scanning programs that limit outgoing scans from home address services (like a fiber optic service, cable, or digital subscriber line (DSL)).

For a segmentation, a success rate may be determined. A total number of logins (nT) may be counted. A number of logins that are successful (nS) may be counted. Then, a success rate ($\alpha S$) may be determined as $\alpha S=(nS)/(nT)$. Where the success rate is less than a threshold amount ($\alpha min$) (i.e., if ($\alpha S<\alpha min$)), then that segmentation may be greylisted.

A reasoning behind this approach may be as follows. Where a single credential from one IP address attempts to login to a computer system, and fails more than a given number of times, the account is locked. Then, subsequent attempts will be rejected until a predetermined amount of time elapses.

Likewise, a single session (one IP address) attempts to login to several credentials. Under standard processing, if an account login attempt within a session fails more than a given number of times, then the account is locked. By the associative property of sets (where (a+b)+c=a+(b+c)), this applies to success and failure rates as well. In a spray attack, one will reach the $\alpha S$ limit relatively quickly, so no further credential verification is permitted.

Exemplary Hardware, Software and Communications Environment

FIG. 1 illustrates an example system architecture 100 for using digital traffic data for analysis. It can be appreciated that this Figure shows an example of a network architecture, and that there can be other network architectures in which using digital traffic data for analysis can be implemented. In some examples, system architecture 100 can comprise a telecommunications network. As depicted, system architecture 100 comprises: Class D network 102a (which includes computing device 106a); Class D network 102b (which includes computing device 106b and computing device 106c); Class C network 104 (which includes computing device 106d and computing device 106e); Internet 108; and computer system 110 (which includes greylisting component 112 and system resources 114).

Class D network 102a and Class D network 102b each comprise a range of IPv4 addresses, from 224.0.0.0 to 239.255.255.255, with Class D network 102a and Class D network 102b each having a separate range of IP addresses from 224.0.0.0 to 239.255.255.255 that may be assigned to computing devices within each respective network. In various embodiments, a Class C network is defined with three high-order bits set to 1, 1, and 0, and the next 21 bits to number the networks, while a Class D network is defined with four high-order bits set to 1, 1, 1, and 0, and the Class D network is reserved for multicasting. As depicted, computing device 106a is within Class D network 102a, and has an IP address in the range from 224.0.0.0 to 239.255.255.255. Then, computing device 106b and computing device 106c are within Class D network 102b, and each of computing device 106b and computing device 106c has an IP address in the range from 224.0.0.0 to 239.255.255.255.

Class C network 104 comprises a range of IPv4 addresses, from 192.0.0.0 to 223.255.255.255. Computing device 106d and computing device 106e are within Class C network 104, and each of computing device 106d and computing device 106e has an IP address in the range from 192.0.0.0 to 223.255.255.255.

Class D network 102a, Class D network 102b, and Class C network 104 are each communicatively connected to Internet 108, so the respective computing devices, which are computing device 106a, computing device 106b, computing device 106c, computing device 106d, and computing device 106e, are communicatively connected to Internet 108. Internet 108 is a global communications network that is configured to communicatively connect computing devices. Internet 108 is also communicatively connected with computer system 110.

Computer system 110 has greylisting component 112, which processes login attempts from computing devices 106a-106e. It may be appreciated that this aspect of processing login attempts is simplified for the sake of clarity, and that further aspects of processing login attempts are described with respect to the other Figures. Where computer system 110, in conjunction with greylisting component 112, determines that a login attempt should be allowed (as opposed to being greylisted or blacklisted, for example) then the remote computer may receive access to system resources 114 that is commensurate with its account privileges. Examples of system resources 114 may include access to information in a database, access to an online music streaming service, or access to a cloud-based email service.

Where computer system 110 does greylist a login attempt, computer system 110 may apply, or segment, this greylist in a variety of ways. For example, this greylisting may be applied to a single IP address in a Class D subnet (such as the IP address associated with computing device 106a). This greylisting may be applied to a plurality of IP addresses in a Class D subnet (such as all IP addresses in a given Class D subnet, or a plurality of addresses, such as those belonging to computing device 106b and computing device 106c; in some examples, this greylisting may be applied to computing device 106c even where computing device 106c did not make a login attempt during the period for which greylisting was determined). This greylisting may also be applied to a plurality of IP addresses in a Class C subnet (such as all IP addresses in a given Class C subnet, or a plurality of addresses, such as those belonging to computing device 106d and computing device 106e).

Example Computing Device for Digital Traffic Data Analysis

Figure 2:
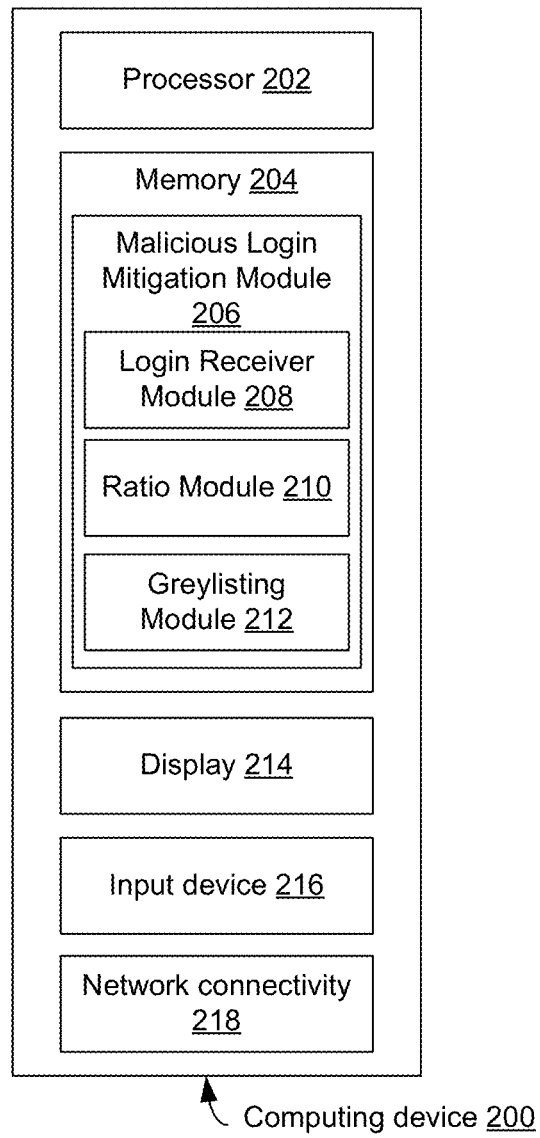
FIG. 2 illustrates an example block diagram of various components of a computing device for implementing mitigating against malicious login attempts.

FIG. 2 illustrates an example block diagram of various components of a computing device for mitigating against malicious login attempts. As depicted, FIG. 2 contains computing device 200. In some examples, computing device 200 can be a computer of one or more computers that comprise a computer system, like computer system 110 of FIG. 1. In other examples, an instance of computing device 200 can be used to implement one or more of computing devices 106a-106e of FIG. 1. In other embodiments, computing device 200 or components thereof may be virtual computing devices in the form of virtual machines or software containers that are hosted in a computing cloud.

Computing device 200 contains several components, including processor 202, memory 204, display 214, input device 216, and network connectivity 218.

Processor 202 is a microprocessor, such as a central processing unit (CPU) that is configured to execute computer-executable instructions, including computer-executable instructions that make up malicious login mitigation module 206 of memory 204. Memory 204 can be implemented using computer-readable media, such as computer storage media, that is configured to store computer-executable instructions. Computer-readable media includes, at least, two types of computer-readable media, namely computer storage media and communications media.

Computer storage media includes non-transitory volatile and non-volatile, removable and non-removable media implemented in any method or technology for storage of information such as computer readable instructions, data structures, program modules, or other data. Computer storage media includes, but is not limited to, random access memory (RAM), read-only memory (ROM), electrically erasable programmable read-only memory (EEPROM), flash memory or other memory and/or storage technology, or any other non-transmission medium that can be used to store information for access by a computing device.

In contrast, communication media can embody computer readable instructions, data structures, program modules, or other data in a modulated data signal, such as a carrier wave, or other transmission mechanism. As defined herein, computer storage media does not include communication.

Malicious login mitigation module 206, as stored in the memory 204, comprises a set of computer executable instructions stored together as a discrete whole. Examples of software modules include binary executables such as static libraries, dynamically linked libraries, and executable programs. Other examples of software modules include interpreted executables that are executed on a run time such as servlets, applets, p-Code binaries, and Java binaries. Software modules include computer-executable instructions that can run in kernel mode and/or user mode.

In various embodiments, malicious login mitigation module 206 may include login receiver module 208, ratio module 210, and greylisting module 212. Examples of the operations of login receiver module 208 are discussed in the context of operation 702 of FIG. 7; examples of the operations of ratio module 210 are discussed in the context of operation 704 of FIG. 7; and examples of the operations of greylisting module 212 are discussed in the context of operation 706 of FIG. 7. Accordingly, malicious login mitigation module 206 can comprise a set of computer executable instructions that, when executed on processor 202, implement at least one of the operating procedures of FIG. 7.

Display 214 is a display, such as a liquid crystal display (LCD), that is configured to display visual output by computing device 200. Input device 216 is computer hardware configured to receive and process user input, such as touch input, or physical buttons that a user can press, as with a mouse or keyboard. Where input device 216 is configured to receive tough input, input device 216 and display 214 can together form a touch screen.

Network connectivity 218 comprises one or more radios configured to send and/or receive wireless communications. Network connectivity 218 can be configured to send and receive cellular network communications, such as via a Long-Term Evolution (LTE), Voice over LTE (VoLTE), or LTE in unlicensed spectrum (LTE-u) protocol. Network connectivity 218 can also be configured to send wireless local area network communications, such as via a WiFi protocol, or another 802.11 protocol. Network connectivity 218 can be configured to communicate via a near field communications protocol, such as a Bluetooth communications protocol. Network connectivity 218 can also be configured to communicate via physical connection, such as via a Transmission Control Protocol/Internet Protocol (TCP/IP) protocol via an Ethernet cable.

Figure 7:
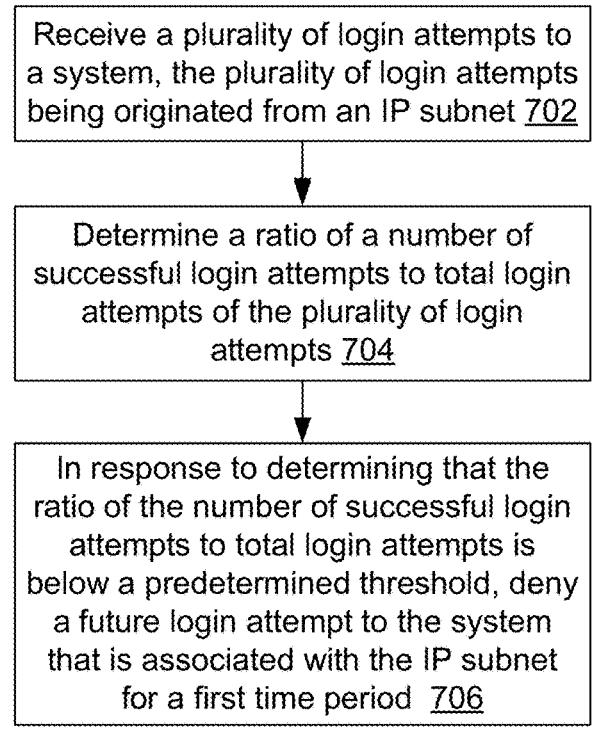
FIG. 7 illustrates a flow diagram of example operating procedures for mitigating against malicious user login attempts.

One or more instances of the computing device 200 can be used to implement aspects of the disclosure, such as to implement the operating procedures of FIG. 7. For example, the operating procedures of FIG. 7 can be stored in memory 204 as malicious login mitigation module 206 and executed by processor 202.

Initial Processing of Login Attempts

Figure 3:
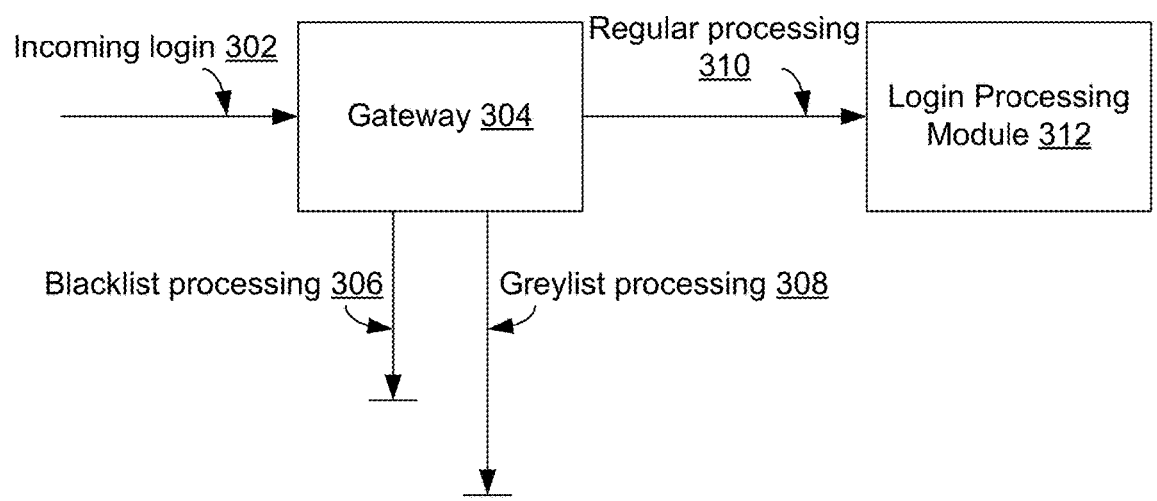
FIG. 3 illustrates an example system architecture for processing login attempts to a computer system.

FIG. 3 illustrates an example system architecture for processing login attempts to a computer system. In some examples, system architecture 300 can be used to implement some or all of operating procedures 700 of FIG. 7 in processing login attempts.

In system architecture 300, an incoming login attempt 302 is received by gateway 304. Gateway 304 then performs initial processing on the incoming login attempt 302. Gateway 304 can categorize the incoming login attempt in a variety of ways. As depicted, gateway 304 can categorize the login attempt as being blacklisted 306, greylisted 308, or regular 310 (which may include whitelisted login attempts).

Where gateway 304 categorizes a login attempt as blacklisted 306, gateway 304 may process the login attempt by denying the login attempt, without passing the login attempt to another part of system architecture 300—such as login processing module 312—for further processing. Similarly, where gateway 304 categorizes a login attempt as greylisted 308, gateway 304 may process the login attempt by denying the login attempt in accordance with a greylisting approach, without passing the login attempt to another part of system architecture 300—such as login processing module 312—for further processing.

Login attempts that are neither blacklisted nor greylisted (or otherwise denied by gateway 304) may be passed by gateway 304 to login processing module 312, as shown by regular processing 310. Login processing module 312 may then perform other functions to process the login attempt, such as by comparing a username and password provided in the login attempt to a database of allowed username and password combinations (which may be encrypted or otherwise securely stored). Where the provided username and password match a username and password in the database, login processing module 312 may determine that incoming login attempt 302 should be allowed, and send an indication to gateway 304 to allow incoming login attempt 302.

Further Additional Processing of Login Attempts

Figure 4:
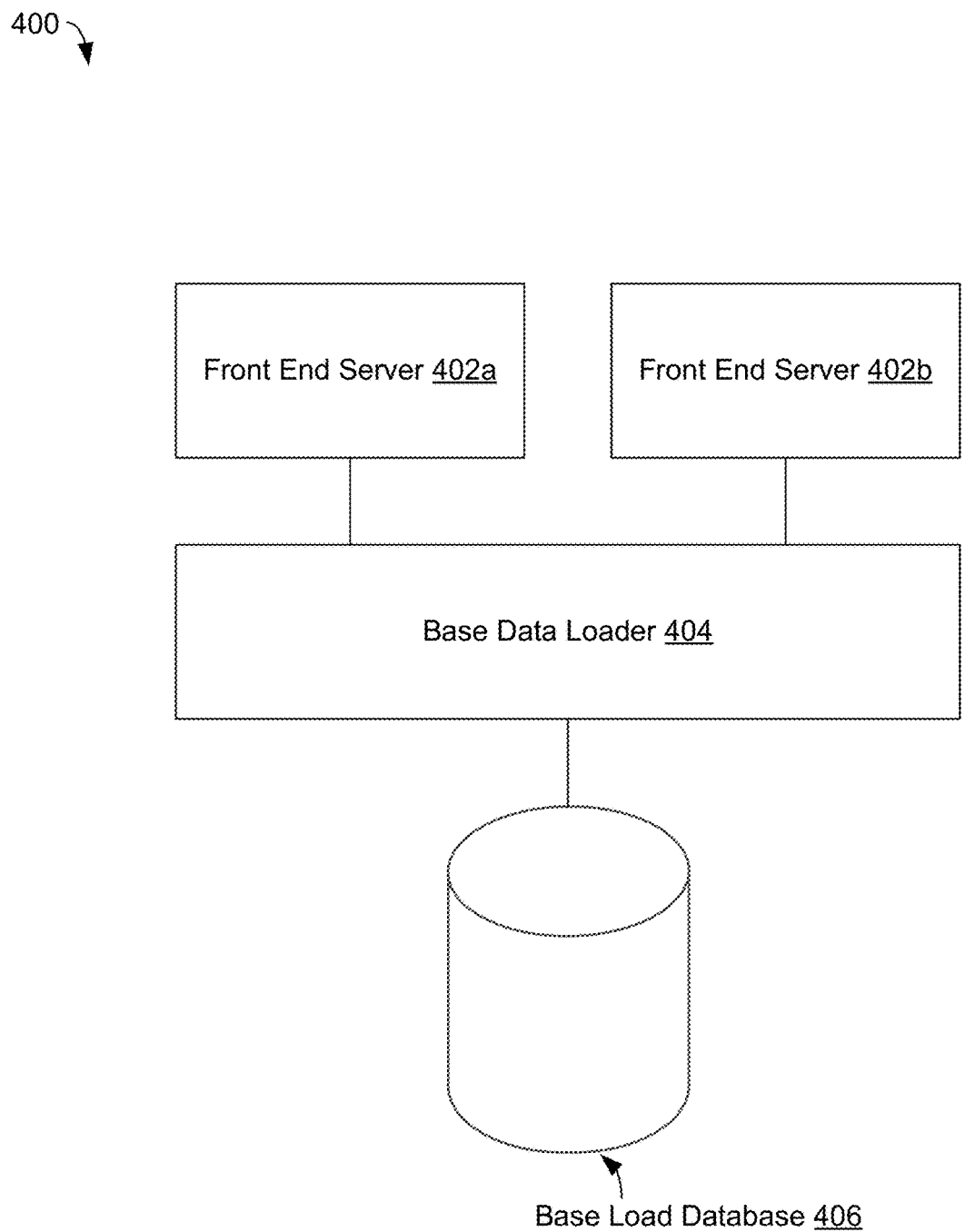
FIG. 4 illustrates another example system architecture for processing login attempts to a computer system.

FIG. 4 illustrates another example system architecture for processing login attempts to a computer system. In some examples, system architecture 400 can be used to implement some or all of operating procedures 700 of FIG. 7 in processing login attempts.

System architecture 400 comprises front end server 402a, front end server 402b, base data loader 404, and base load database 406. In system architecture 400, login attempts are received by a plurality of front end servers—depicted here as front end server 402a and front end server 402b.

Each front end server is configured to make a decision about whether to blacklist a login attempt, greylist the login attempt, or allow the login attempt to undergo further processing (such as is performed by gateway 304 of FIG. 3). However, in making these determinations, each front end server relies on information from login attempts received at other front end servers (e.g., to make a greylisting determination for a particular login attempt, front end server 402a may utilize information about login attempts received at front end server 402b). In system architecture 400, information about login attempts is then shared between front end servers, and this shared information about login attempts is accessed by a front end server communicating with base data loader 404, which maintains the information about login attempts in base load database 406.

Front end server 402a and front end server 402b are configured to query base data loader 404 for information about login attempts, such as a ratio of a number of successful login attempts to total login attempts for a given IP address over a given time period that have been received by system architecture 400. Additionally, front end server 402a and front end server 402b are configured to send information about new login attempts to base data loader 404, which maintains that information in base load database 406.

This information about login attempts that front end server 402a and front end server 402b are configured to send to base data loader 404 may include an originating IP address of the login attempt; a data time stamp of the login attempt; and end user identification (EUI) information. This EUI information may include category, operation, status, and account.

Front end server 402a and front end server 402b may be configured to transmit streaming updates regarding this information about login attempts to base data loader 404. This data can be vectorized to reduce bandwidth utilized in transmitting this information.

Segmenting Login Attempts

Figure 5:
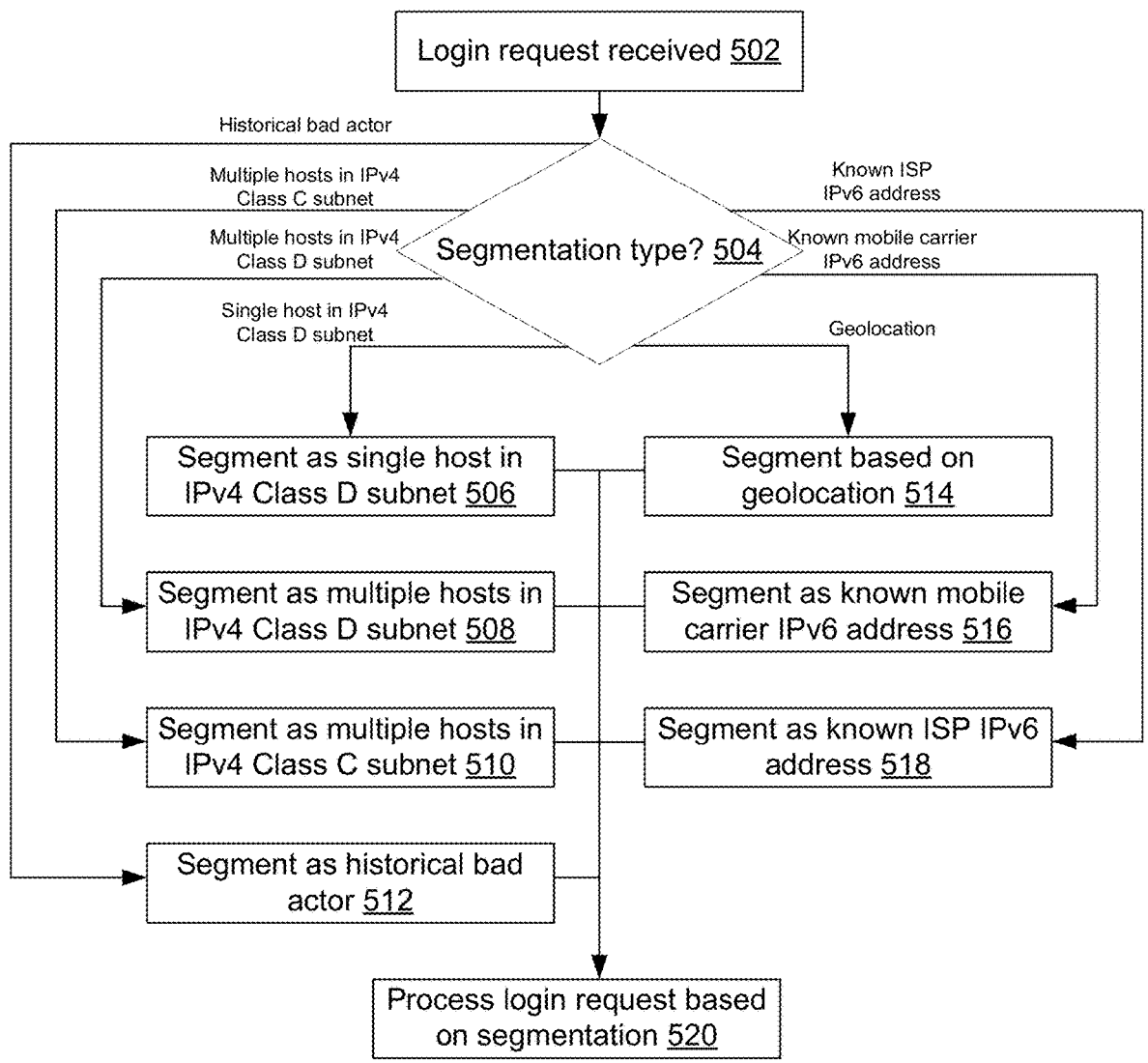
FIG. 5 illustrates an example flow diagram for processing login attempts using segmentation.

FIG. 5 illustrates an example flow diagram for processing login attempts using segmentation. It can be appreciated that the operating procedures of FIG. 5 are example operating procedures, and that there can be examples that implement more or fewer operations than are depicted, or that implement the operations in a different order than is depicted here.

In some examples, the example operating procedures 500 of FIG. 5 can be implemented by system architecture 100, and in particular computer system 110, to process login attempts using greylisting component 112.

Operating procedures 500 begin with operation 502. Operation 502 depicts receiving a login request. This login request can be, for example, a login request originated by computing device 106a, and transmitted through Internet 108, where the request is received by computer system 110. After operation 502, the operating procedures of FIG. 5 move to operation 504.

Operation 504 depicts determining a segmentation type for the login request. By way of example, a login can be segmented into one or more categories based on its characteristics, and these different types of segments can include a single host in an IPv4 Class D subnet; multiple hosts in an IPv4 Class D subnet; multiple hosts in an IPv4 Class C subnet; historical bad actors; geolocation; a known mobile carrier IPv6 address; and a known ISP IPv6 address. Based on how the login request is segmented, after operation 504, the operating procedures of FIG. 5 move to one or more of operations 506, 508, 510, 512, 514, 516, and 518.

Operation 506 is reached from operation 504 where the segmentation type is a single host in an IPv4 Class D subnet. Operation 506 depicts segmenting the login request as a single host in an IPv4 Class D subnet. By segmenting the login request in this manner, the request may be subsequently processed, such as by determining if a ratio a number of successful login attempts to total login attempts received from this segment is below a minimum threshold, and where the ratio is below that threshold, greylisting that segment. Segmenting in this context can comprise storing information about at least some login attempts that meet this segmentation criteria (e.g., an identifier of the relevant segmentation type, an identifier of each login attempt, whether the login attempt was successful, and a time at which the login attempt occurred). After operation 506, the operating procedures of FIG. 5 move to operation 520.

Operation 508 is reached from operation 504 where the segmentation type is multiple hosts in an IPv4 Class D subnet. Operation 508 depicts segmenting the login request as multiple host in an IPv4 Class D subnet. Segmenting in operation 508 can be performed in a similar manner as segmenting in operation 506. After operation 508, the operating procedures of FIG. 5 move to operation 520.

Operation 510 is reached from operation 504 where the segmentation type is multiple hosts in an IPv4 Class C subnet. Operation 510 depicts segmenting the login request as multiple host in an IPv4 Class D subnet. Segmenting in operation 510 can be performed in a similar manner as segmenting in operation 506. After operation 510, the operating procedures of FIG. 5 move to operation 520.

Operation 512 is reached from operation 504 where the segmentation type is a historical bad actor. Operation 512 depicts segmenting the login request as from a historical bad actor. Segmenting in operation 512 can be performed in a similar manner as segmenting in operation 506. After operation 512, the operating procedures of FIG. 5 move to operation 520.

Operation 514 is reached from operation 504 where the segmentation type is geolocation. Operation 514 depicts segmenting the login request based on its geolocation. Segmenting in operation 514 can be performed in a similar manner as segmenting in operation 506. After operation 514, the operating procedures of FIG. 5 move to operation 520.

Operation 516 is reached from operation 504 where the segmentation type is a known mobile carrier IPv6 address. Operation 516 depicts segmenting the login request as a known mobile carrier IPv6 address. Segmenting in operation 516 can be performed in a similar manner as segmenting in operation 506. After operation 516, the operating procedures of FIG. 5 move to operation 520.

Operation 518 is reached from operation 504 where the segmentation type is a known ISP IPv6 address. Operation 518 depicts segmenting the login request as a known ISP IPv6 address. Segmenting in operation 518 can be performed in a similar manner as segmenting in operation 506. After operation 518, the operating procedures of FIG. 5 move to operation 520.

Operation 520 is reached from operations 506-518. Operation 520 depicts processing the login request based on its segmentation. Processing the login request can comprise determining whether to whitelist, blacklist, or greylist the login request, and allowing or disallowing the login request accordingly.

In some examples, a login request may be segmented multiple ways. For example, a login request could be from a single host in an IPv4 Class D subnet (operation 506), and also be from a historical bad actor (operation 512). In some examples, where multiple segmentation types apply, the login attempt may be processed according to each of its segmentation types, and the lowest level of access permissions determined for each of its segmentation types may be the access permissions accorded to the login attempt.

Consider an example where a login attempt is segmented as both a single host in an IPv4 Class D subnet and is from a historical bad actor. In this case, it can be that for the IPv4 class D segment, the ratio of a number of successful logins to total logins is above a threshold for greylisting, so the login attempt is not greylisted (or blacklisted). However, the login attempt being segmented as from a historical bad actor may result in an indication that the login attempt is to be blacklisted. Of these two segmentations, the lowest level of access permissions determined is blacklisting (as opposed to greylisting), and the login attempt is processed based on it being blacklisted.

Architecture for Processing Login Attempts

Figure 6:
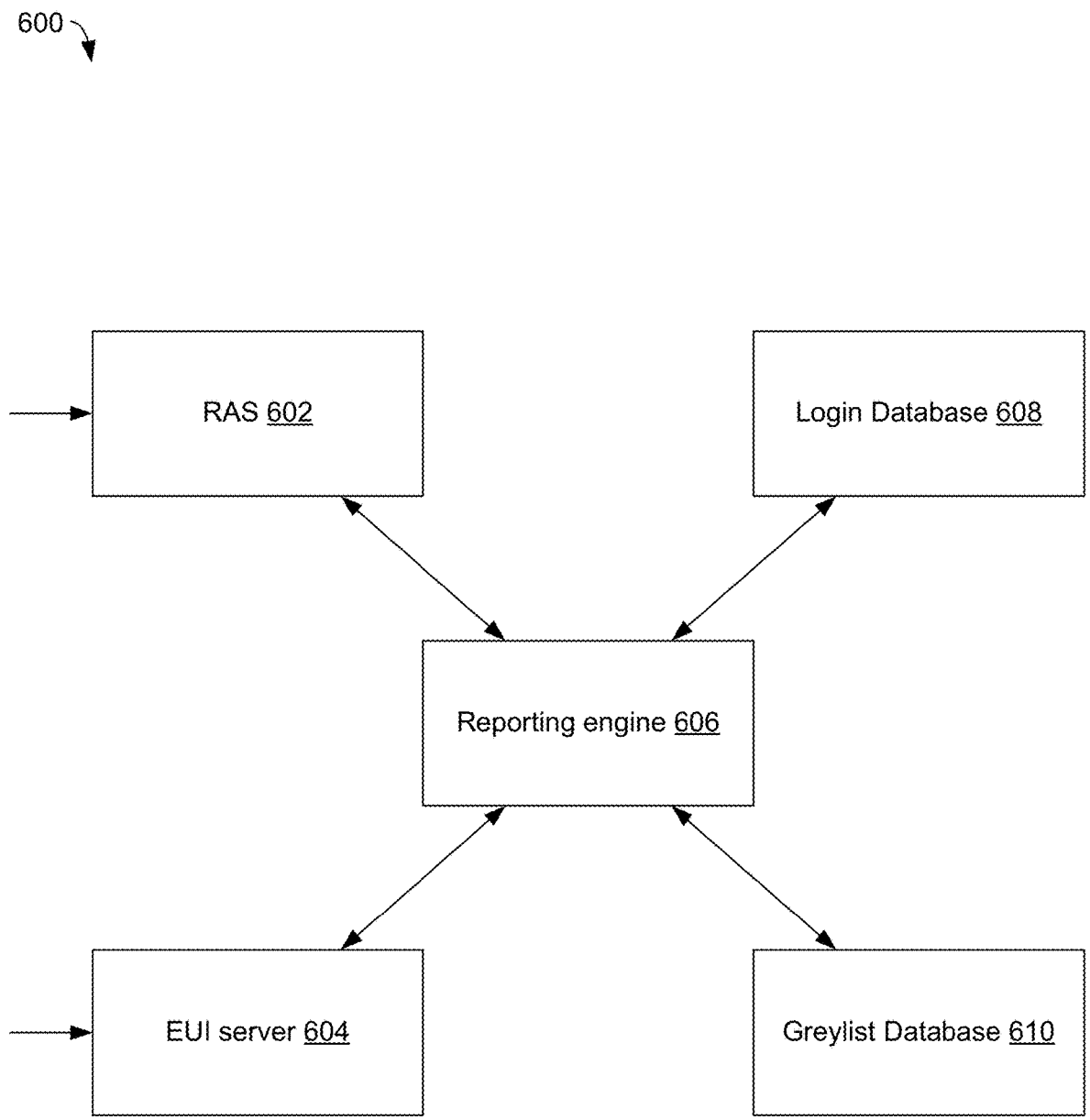
FIG. 6 illustrates another example system architecture for processing login attempts to a computer system.

FIG. 6 illustrates another example system architecture for processing login attempts to a computer system. In some examples, system architecture 600 can be used to implement some or all of operating procedures 700 of FIG. 7 in processing login attempts.

System architecture 600 comprises restful authentication server (RAS) 602, EUI server 604, reporting engine 606, login database 608, and greylist database 610. Login attempts to system architecture 600 arrive at two components: (a) RAS 602 is a cloud-based service that receives credentials other than usernames and passwords expressed via text. This other information may include biometric authentication information such as fingerprints, facial recognition information, voice recognition information, and iris scans. (b) EUI server 604 receives login credentials in the form of usernames and/or passwords that are expressed via text. Both RAS 602 and EUI server 604 are configured to deny login attempts that are blacklisted.

RAS 602 and EUI server 604 then forward non-blacklisted login attempts to reporting engine 606 (and may also forward information about the blacklisted login attempts that RAS 602 and EUI server 604 deny). Reporting engine 606 stores information about the login attempts in two locations: (a) logs about login attempts are stored in login database 608; and a greylist for login attempts is maintained in greylist database 610. In some embodiments, these two databases—login database 608 and greylist database 610—may differ based on how much information is being stored. For example, it may be that significantly more information is stored in login database 608 than in greylist database 610, so login database 608 is architected as a big data database, such as a Splunk database, while greylist database 610 is architected as an in-memory database, such as a Memcat database.

Reporting engine 606 can then evaluate the incoming login attempt against a matrix of IP addresses and accounts. For example, a given IP address—w.x.y.x—may have N accounts associated with it from prior login attempts (either within a prior time window, or regardless of time frame). Reporting engine 606 may track both failures and successes.

Then, from tracked failures and successes, reporting engine 606 may determine αS. Based on these determinations, where αS is below a threshold value, reporting engine 606 may then add the IP address associated with the login attempt to the greylist and greylist database 610, or reporting engine 606 may add the IP address and account associated with the login attempt to the greylist and greylist database 610.

Both RAS 602 and EUI server 604 may insert delays into the login process. These delays may be randomized (e.g., one IP address may be greylisted for 1 day, while another IP address may be greylisted for 7 days). Where an IP address has a history of being greylisted (and this history may be maintained by reporting engine 606 in login database 608 and/or greylist database 610), then the IP address may be greylisted for an increased amount of time, such as for 30 days rather than 7 days if the IP address did not have a history of being greylisted. This history of being greylisted may be determined to be a threshold number of greylistings within a given time period, or regardless of time (e.g., if the IP address were to have been greylisted at least three times within the prior 6 months).

Reporting engine 606 may also implement other delays. For example, reporting engine may greylist an IP address by introducing a delay in the amount of time that reporting engine 606 spends before responding to a login request, as opposed to a delay until the next time that the IP address may originate a login attempt that will not be greylisted.

Procedures for Mitigating Against Malicious Login Attempts

FIG. 7 illustrates a flow diagram of example operating procedures for mitigating against malicious login attempts. It can be appreciated that the operating procedures of FIG. 7 are example operating procedures, and that there can be examples that implement more or fewer operations than are depicted, or that implement the operations in a different order than is depicted here.

In some examples, the example operating procedures 700 of FIG. 7 can be implemented by system architecture 100, and in particular computer system 110 of FIG. 1, to process login attempts utilizing greylisting component 112.

Operating procedures 700 begin with operation 702. Operation 702 depicts receiving a plurality of login attempts to a system, the plurality of login attempts being originated from an IP subnet. In some examples, the plurality of login attempts are originated from a first IP address (and the corresponding computing device) of the IP subnet, or from multiple IP addresses (and the corresponding computing device or computing devices) of the IP subnet.

In some examples, the IP subnet comprises a Class D subnet, and in some examples, the IP subnet comprises a Class C subnet. After operation 702, the operating procedures of FIG. 7 move to operation 704.

Operation 704 depicts determining a ratio of a number of successful login attempts to total login attempts of the plurality of login attempts. In some examples, operation 704 comprises determining the ratio of a number of successful login attempts to total login attempts of the plurality of login attempts that have occurred over a second time period. That is, a ratio for greylisting purposes may be determined for a specific time window, such as the most recent 20 minutes.

In some examples, operation 704 comprises determining the ratio of a number of successful login attempts to total login attempts of the plurality of login attempts independent of when the successful login attempts and unsuccessful login attempts occurred. That is, a ratio for greylisting purposes may be determined for historical login attempts, regardless of a time when those login attempts occurred. After operation 704, the operating procedures of FIG. 7 move to operation 706.

Operation 706 depicts in response to determining that the ratio of a. number successful login attempts to total login attempts is below a predetermined threshold, denying a future login attempt to the system that is associated with the IP subnet for a first time period.

In some embodiments, operation 706 comprises randomizing a value for the first time period. That is, a greylisted IP subnet may be greylisted for a randomized amount of time (e.g., between 1 day and 7 days, inclusive). In other examples, operation 706 comprises randomizing an amount of time associated with responding to the plurality of login attempts. Rather than greylisting an IP subnet by immediately responding to login attempts with an indication that a login attempt is denied, greylisting may comprise introducing additional time before responding to a login attempt, and this amount of time may be randomized.

In some embodiments, operation 706 comprises, in response to determining that the ratio of a number of successful login attempts to total login attempts is below the predetermined threshold, denying a future login attempt to the system that is associated with an account that is associated with the IP subnet for the first time period. In addition to greylisting an IP address or IP subnet from which a login attempt that is being greylisted originated, an account (such as a username) that is used in these login attempts may also be greylisted, even though an attempt to login to the account may be made from a different IP address or IP subnet.

In some embodiments, the value for the first time period may be determined based on an amount of times that login attempts to the system that are associated with the IP subnet have previously been denied temporarily. Where an IP subnet is subject to greylisting multiple times, the amount of time for which the IP subnet is greylisted may be increased. In some embodiments, the plurality of login attempts to the computer system are received across a plurality of front-end servers of the computer system, and the plurality of front-end servers deny the future login attempt to the computer system that is associated with the IP subnet for a first time period. The system architecture here may be implemented similar to system architecture 400 of FIG. 4, which comprises multiple front end servers.

In some embodiments, determining the ratio of the number of successful login attempts to total login attempts of the plurality of login attempts is performed by a computing device that is separate from the plurality of front-end servers. Continuing with the example of system architecture of FIG. 4, determining the ratio of a number of successful login attempts to total login attempts of the plurality of login attempts may be performed by base data loader 404.

In some embodiments, denying the future login attempt to the computer system that is associated with the IP subnet for the first time period may be performed when the ratio is below the predetermined threshold, and a geographical location from which at least one of the plurality of login attempts originated corresponds to a particular geographical location.

In some embodiments, denying the future login attempt to the computer system that is associated with the IP subnet for the first time period may be performed when the ratio is below the predetermined threshold, and a telecommunications network associated with a mobile device from which at least one of the plurality of login attempts originated corresponds to a particular telecommunication network.

In some embodiments, denying the future login attempt to the computer system that is associated with the IP subnet for the first time period may be performed when the ratio is below the predetermined threshold, and an internet service provider (ISP) associated with an IP address from which at least one of the plurality of login attempts originated matches a particular ISP.

In some embodiments, operation 706 denying the future login attempt to the computer system that is associated with the IP subnet may be performed when the ratio is below the predetermined threshold, and the login attempts originated from a historical bad actor.

In some examples, in addition to or instead of segmenting login attempts for greylisting purposes based on IP addresses or IP subnets, other types of segmentation may be used. These other types of segmenting login attempts may include segmenting login attempts based on geolocation; segmenting login attempts based on the computing device that originated a login attempt being a mobile device that is associated with a particular telecommunications service provider (such as via a MSIDSN of the mobile device, or a telephone number of the mobile device); segmenting login attempts based on a computing device that originated a login attempt connecting to the Internet through a known internet service provider; and segmenting login attempts based on whether or not a historical bad actor (e.g., an entity that has been previously greylisted) is associated with the login attempt.

In some embodiments, denying a future login attempt to the computer system that is associated with the IP subnet for the first time period may be performed when the ratio is below the predetermined threshold, and an end user identification associated with the plurality of login attempts corresponds to a particular end user identification. In some embodiments, the end user identification indicates a category, an operation, a status, or an account.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving, at a front-end server, a plurality of login attempts to a computer system;
segmenting collectively the plurality of login attempts into a plurality of segmentation types of login attempts, including segmenting one login attempt of the plurality of login attempts into more than one segmentation type of the plurality of segmentation types, one of the more than one segmentation type including a known IP address, wherein the plurality of segmentation types are associated with respective levels of access permission to access system resources, the levels ranging from lowest level to highest level corresponding to least right to access the system resources to greatest right to access the system resources;
determining the lowest level of access permission for the one login attempt of the respective access permissions associated with the segmentation types into which the one login attempt is segmented; and
implementing, at the front-end server, processing of the one login attempt according to a blacklist, whitelist, or greylist in accordance with its determined level of access permission.

2. The method of claim 1, wherein:
the plurality of login attempts to the computer system are received across a plurality of front-end servers of the computer system including the front-end server.

3. The method of claim 2, further comprising:
determining a ratio of a number of successful login attempts to total login attempts of the plurality of login attempts for each segmentation type individually;
wherein the determining the ratio of the number of successful login attempts to total login attempts for each segmentation type individually is performed by a computing device that includes a base data loader that is separate from the plurality of front-end servers.

4. The method of claim 1,
wherein the plurality of segmentation types include a geographical location from which the one login attempt originated that corresponds to a particular geographical location; and the method further comprises:
determining that the geographical location corresponds to the particular geographical location;
wherein the implementing, at the front-end server, processing of the one login attempt includes adding the segmentation type having the lowest level of access permission to the greylist in accordance with the determination that the geographical location corresponds to the particular geographical location.

5. The method of claim 1,
wherein the plurality of segmentation types include a telecommunications network associated with a mobile device from which the one login attempt originated that corresponds to a particular telecommunication network; and the method further comprises:
determining that the telecommunications network corresponds to the particular telecommunications network;
wherein the implementing, at the front-end server, processing of the one login attempt includes adding the segmentation type having the lowest level of access permission to the greylist in accordance with the determination that the telecommunications network corresponds to the particular telecommunication network.

6. The method of claim 1:
wherein the segmentation types include an internet service provider (ISP) associated with an IP address from which the one login attempt originated that corresponds to a particular ISP; and the method further comprises:
determining that the ISP corresponds to the particular ISP;
wherein the implementing, at the front-end server, processing of the one login attempt includes adding the segmentation type having the lowest level of access permission to the greylist in accordance with the determination that the ISP corresponds to the particular ISP.

7. The method of claim 1,
wherein the segmentation type is login attempts that are associated with a historical bad actor, and the method further comprises:
determining that the login attempts are associated with the historical bad actor;
wherein the implementing, at the front-end server, processing of the one login attempt includes adding the segmentation type having the lowest level of access permission to the greylist in accordance with the determination that the login attempts are associated with the historical bad actor.

8. The method of claim 1, further comprising:
deciding, at the front end server, whether to blacklist the one login attempt, greylist the one login attempt, or allow the one login attempt to undergo further processing.

9. The method of claim 1, wherein one of the plurality of segmentation types into which the one login attempt is segmented includes whether or not the login attempt is associated with a historically bad actor.

10. The method of claim 9, wherein the historically bad actor is an entity that has been previously greylisted.

11. One or more non-transitory computer-readable media bearing instructions that are executable to perform operations comprising:
receiving, at a front-end server, a plurality of login attempts to a computer system;
segmenting collectively the plurality of login attempts into a plurality of segmentation types of alternate classifiers, including segmenting one login attempt of the plurality of login attempts into more than one segmentation type of the plurality of segmentation types, one of the more than one segmentation type including a known IP address, wherein the plurality of segmentation types are associated with respective levels of access permission to access system resources, the levels ranging from lowest level to highest level corresponding to least right to access the system resources to greatest right to access the system resources;
determining lowest level of access permission of the respective access permissions associated with the segmentation types into which the one login attempt is segmented; and
implementing, at the front-end server, processing of the one login attempt according to a blacklist, whitelist, or greylist in accordance with its determined level of access permission.

12. The one or more non-transitory computer-readable media of claim 11,
wherein the segmentation type is login attempts that are associated with a historical bad actor, and the operations further comprising:
determining that the login attempts are associated with the historical bad actor;
wherein implementing, at the front-end server, processing of the one login attempt includes adding the segmentation type having the lowest level of access permission to the greylist in accordance with the determination that the login attempts are associated with the historical bad actor.

13. The one or more non-transitory computer-readable media of claim 11, wherein one of the plurality of segmentation types into which the one login attempt is segmented includes whether or not the login attempt is associated with a historically bad actor.

14. The one or more non-transitory computer-readable media of claim 13, wherein the historically bad actor is an entity that has been previously greylisted.

* * * * *